US012345472B2

(12) United States Patent
Ishida

(10) Patent No.: US 12,345,472 B2
(45) Date of Patent: Jul. 1, 2025

(54) HEATER

(71) Applicant: Brother Kogyo Kabushiki Kaisha, Nagoya (JP)

(72) Inventor: Kei Ishida, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 1011 days.

(21) Appl. No.: 16/918,081

(22) Filed: Jul. 1, 2020

(65) Prior Publication Data

US 2021/0003348 A1 Jan. 7, 2021

(30) Foreign Application Priority Data

Jul. 5, 2019 (JP) ................................. 2019-126446

(51) Int. Cl.

| | |
|---|---|
| ***F28D 1/03*** | (2006.01) |
| ***B41J 2/335*** | (2006.01) |
| ***B41J 2/345*** | (2006.01) |
| ***F28F 3/02*** | (2006.01) |

(52) U.S. Cl.

CPC ............ *F28D 1/0325* (2013.01); *B41J 2/335* (2013.01); *B41J 2/33515* (2013.01); *B41J 2/3354* (2013.01); *B41J 2/3357* (2013.01); *B41J 2/345* (2013.01); *F28F 3/025* (2013.01)

(58) Field of Classification Search

CPC ..... F28D 1/0325; B41J 2/335; B41J 2/33515; B41J 2/3354; B41J 2/3357; B41J 2/345; F28F 3/025; G03G 15/20; H05B 3/12; H05B 3/10

See application file for complete search history.

(56) References Cited

U.S. PATENT DOCUMENTS

| | | | | |
|---|---|---|---|---|
| 10,281,857 | B1 | 5/2019 | Aikawa | |
| 2011/0062140 | A1 | 3/2011 | Sakakibara | |
| 2017/0363998 | A1* | 12/2017 | Takagi | H05B 3/26 |

FOREIGN PATENT DOCUMENTS

| | | | | |
|---|---|---|---|---|
| JP | H096161 | A | * | 1/1997 |
| JP | 2007311136 | A | * | 11/2007 |
| JP | 2008-040097 | A | | 2/2008 |
| JP | 2009-009720 | A | | 1/2009 |

(Continued)

OTHER PUBLICATIONS

Japanese Office Action (with English translation) dated Mar. 14, 2023 (Application No. 2019-126446).

*Primary Examiner* — Steven W Crabb
*Assistant Examiner* — Theodore J Evangelista
(74) *Attorney, Agent, or Firm* — Merchant & Gould P.C.

(57) ABSTRACT

A heater includes: a substrate including a first surface and a second surface located opposite to the first surface relative to the substrate; a first heating pattern disposed on a first-surface side of the substrate; a second heating pattern disposed on the first-surface side of the substrate and located at a position different from a position of the first heating pattern; a first terminal to which electricity is to be supplied; a first power-supply pattern electrically connecting the first terminal and the first heating pattern to each other and disposed on a second-surface side of the substrate; and a first electrically-continuous portion extending through the substrate and electrically connecting the first power-supply pattern and the first heating pattern to each other.

15 Claims, 10 Drawing Sheets

(56) References Cited

FOREIGN PATENT DOCUMENTS

| | | | | |
|---|---|---|---|---|
| JP | 2011-029088 | A | | 2/2011 |
| JP | 2015-180971 | A | | 10/2015 |
| JP | 2017156635 | A | * | 9/2017 |
| JP | 2017-227872 | A | | 12/2017 |
| JP | 2019-105794 | A | | 6/2019 |

* cited by examiner

HEATER

CROSS REFERENCE TO RELATED APPLICATION

The present application claims priority from Japanese Patent Application No. 2019-126446, which was filed on Jul. 5, 2019, the disclosure of which is herein incorporated by reference in its entirety.

BACKGROUND

The following disclosure relates to a heater having a planar plate shape.

There are conventionally known heaters used for a fixing device, the heaters including: an elongated substrate formed of a material such as ceramic; a first heating pattern disposed at a center of the substrate in its longitudinal direction; two second heating patterns arranged respectively at opposite end portions of the substrate in the longitudinal direction; a first power-supply pattern electrically continuous to the first heating pattern; and a second power-supply pattern electrically connecting the two second heating patterns to each other. In this technique, specifically, the heating patterns and the power-supply patterns are formed on the same surface of the substrate. The first heating pattern is disposed at a position different from that of each of the second heating patterns in a widthwise direction of the substrate.

The first power-supply pattern extends from the first heating pattern toward opposite ends of the substrate in the longitudinal direction and is located side by side with the second heating patterns in the widthwise direction. The second power-supply pattern extends from the one-end-side second heating pattern toward the other-end-side second heating pattern and is located side by side with the first heating pattern in the widthwise direction.

SUMMARY

In the conventional technique, however, each of the heating patterns is located side by side with a corresponding one or two of the power-supply patterns in the widthwise direction. Thus, in the case where the size of the heating pattern in the widthwise direction is desired to be made as large as possible for higher thermal efficiency, the power-supply pattern or patterns hinder forming of the heating pattern over a large region extending from one end to the other end of the substrate in the widthwise direction, unfortunately.

Accordingly, an aspect of the disclosure relates to a heater including a plurality of heating patterns formed over a relatively large region extending from one end to the other end of a substrate in its widthwise direction.

In one aspect of the disclosure, a heater includes: a substrate including a first surface and a second surface located opposite to the first surface relative to the substrate; a first heating pattern constituted by a heating resistor and disposed on a first-surface side of the substrate; a second heating pattern constituted by a heating resistor, disposed on the first-surface side of the substrate, and located at a position that is different from a position of the first heating pattern in a longitudinal direction of the substrate; a first terminal to which electricity is to be supplied; a first power-supply pattern electrically connecting the first terminal and the first heating pattern to each other and disposed on a second-surface side of the substrate; and a first electrically-continuous portion extending through the substrate and electrically connecting the first power-supply pattern and the first heating pattern to each other.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Figure 1:
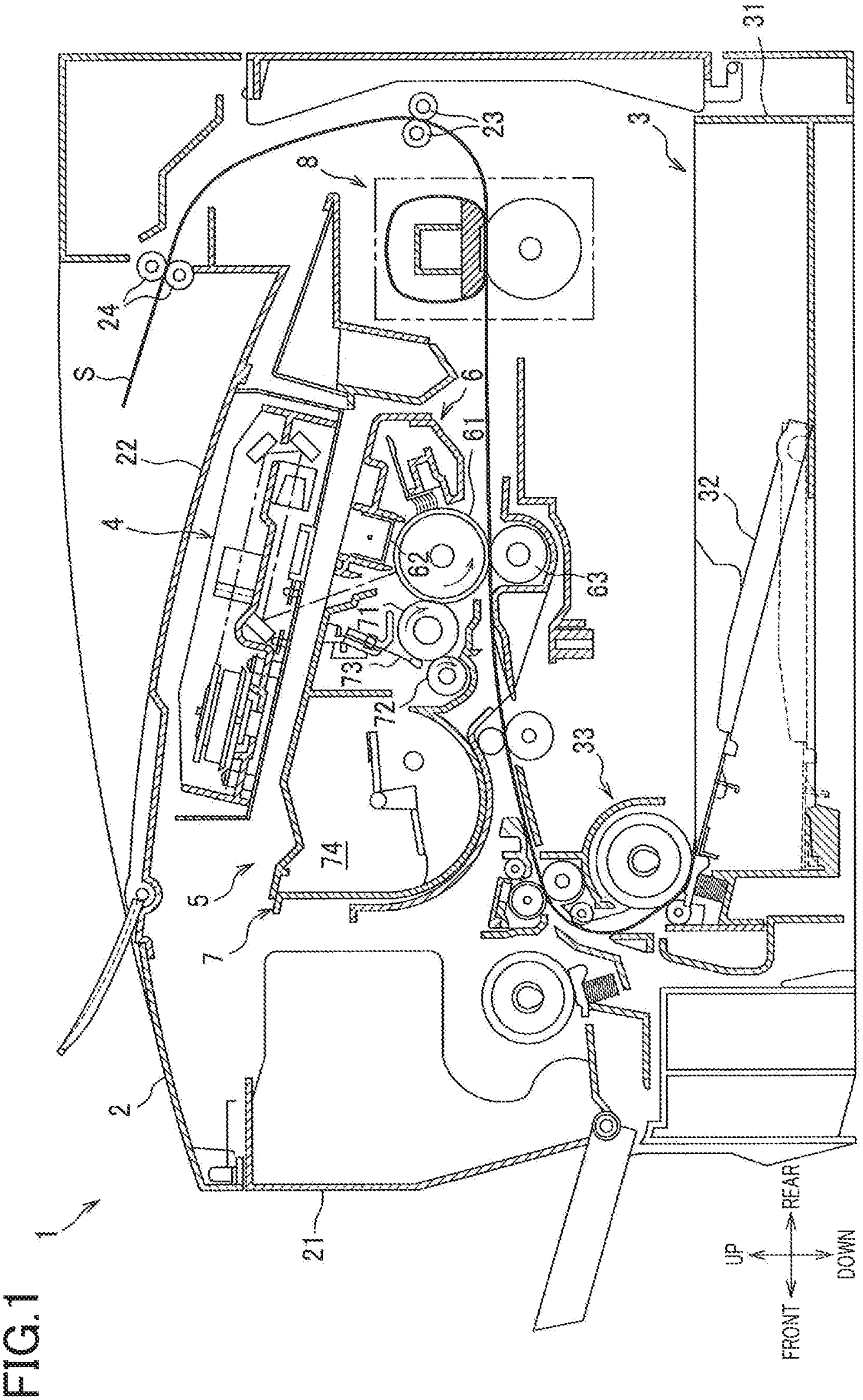
FIG. 1 is a cross-sectional view of a laser printer according to one embodiment.

Hereinafter, there will be described one embodiment by reference to the drawings. As illustrated in FIG. 1, a laser printer 1 includes a supplier 3, an exposing device 4, a process cartridge 5, and a fixing device 8 in a housing 2.

The supplier 3 is provided at a lower portion of the housing 2 and includes a supply tray 31 for accommodating sheets S, a pressing plate 32, and a supply mechanism 33. The sheet S accommodated in the supply tray 31 is moved upward by the pressing plate 32 and supplied into the process cartridge 5 by the supply mechanism 33.

The exposing device 4 is disposed at an upper portion of the housing 2 and includes a light source device, not illustrated, and a polygon mirror, a lens, a reflective mirror, and so on illustrated without reference numerals. The exposing device 4 exposes a surface of a photoconductor drum 61 by scanning the surface of the photoconductor drum 61 at high speed with a light beam emitted from the light source device based on image data.

The process cartridge 5 is disposed below the exposing device 4 and removably mountable in the housing 2 through an opening that is formed when opening a front cover 21 provided on the housing 2. The process cartridge 5 includes a drum unit 6 and a developing unit 7. The drum unit 6 includes the photoconductor drum 61, a charging unit 62, and a transfer roller 63. The developing unit 7 is mountable to and removable from the drum unit 6 and includes a developing roller 71, a supply roller 72, a layer-thickness limiting blade 73, and a container 74 containing toner.

In the process cartridge 5, the surface of the photoconductor drum 61 is uniformly charged by the charging unit 62 and then exposed by the light beam emitted from the exposing device 4 to form an electrostatic latent image on the photoconductor drum 61 based on the image data. The toner in the container 74 is supplied to the developing roller 71 by the supply roller 72 so as to enter a position between the developing roller 71 and the layer-thickness limiting blade 73, so that the toner is born on the developing roller 71 as a thin layer having a specific thickness. The toner born on the developing roller 71 is supplied from the developing roller 71 to the electrostatic latent image formed on the photoconductor drum 61. This visualizes the electrostatic latent image, thereby forming a toner image on the photoconductor drum 61. The sheet S is thereafter conveyed between the photoconductor drum 61 and the transfer roller 63, so that the toner image formed on the photoconductor drum 61 is transferred to the sheet S.

The fixing device 8 is disposed downstream of the process cartridge 5 in a conveying direction of the sheet S. The toner image is fixed while the sheet S to which the toner image is transferred is passing through the fixing device 8. The sheet S to which the toner image is fixed is discharged onto an output tray 22 by conveying rollers 23, 24.

Figure 2:
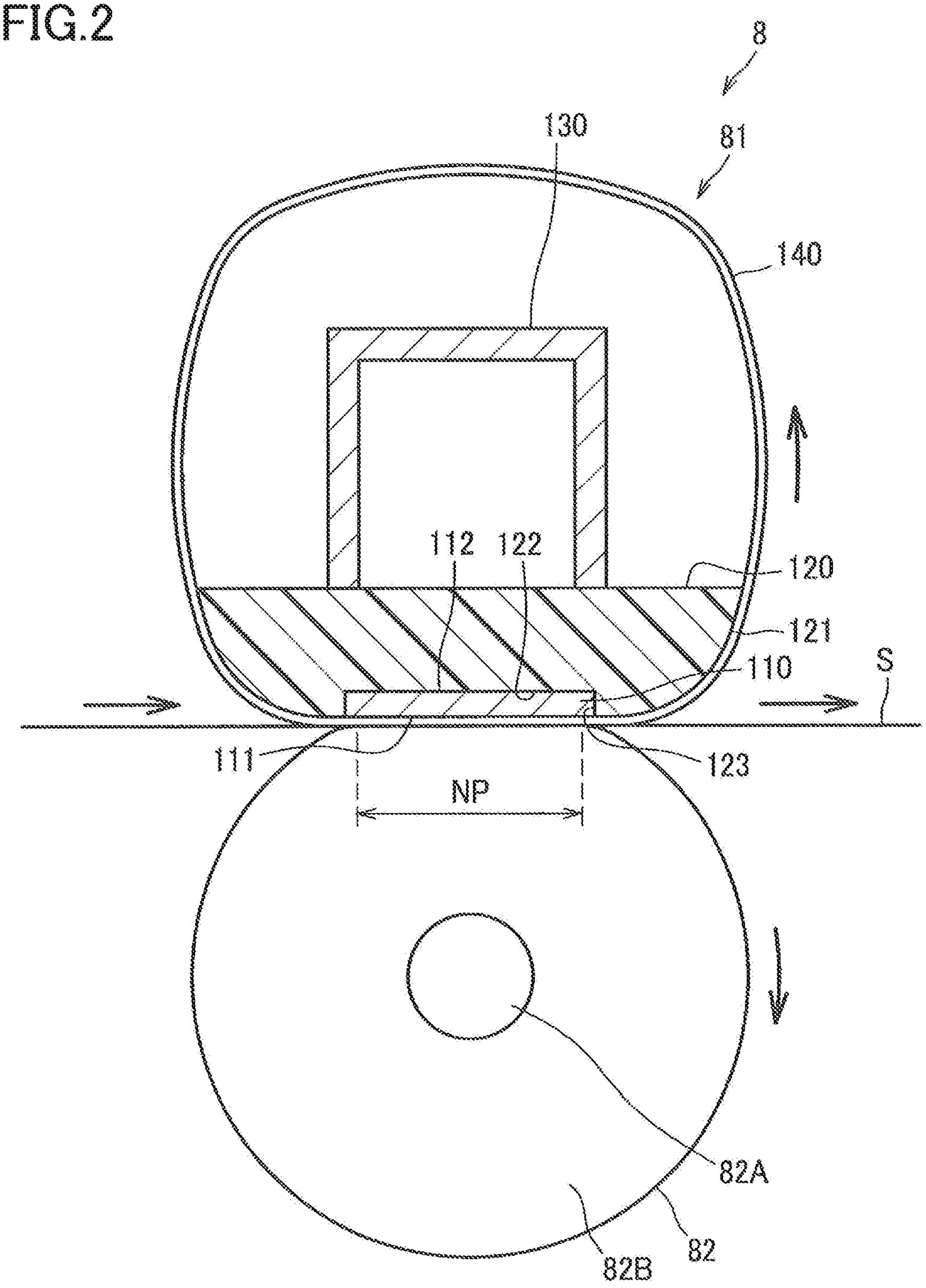
FIG. 2 is a cross-sectional view of a fixing device.

As illustrated in FIG. 2, the fixing device 8 includes a heating unit 81 and a pressure roller 82. One of the heating unit 81 and the pressure roller 82 is urged to the other by an urging mechanism, not illustrated.

The heating unit 81 includes a heater 110, a holder 120, a stay 130, and a belt 140. The heater 110 is of a planar plate shape and supported by the holder 120. It is noted that the configuration of the heater 110 will be described later in detail.

The holder 120 is formed of resin and has a guide surface 121 for guiding the belt 140 by contacting an inner circumferential surface of the belt 140. The holder 120 has a heater supporting surface 122 for supporting the heater 110. The heater supporting surface 122 supports the heater 110 by contacting one of opposite surfaces of the heater 110 which is farther from the pressure roller 82 than the other. The holder 120 has a heater supporting surface 123 that contacts the heater 110 in the conveying direction of the sheet S. The stay 130 is a member for supporting the holder 120 and formed by bending a plate member having stiffness greater than that of the holder 120, e.g., steel sheet, in a substantially U-shape in cross section.

The belt 140 is an endless belt having heat resistance and flexibility and including a metal raw tube formed of metal such as stainless steel, and a fluororesin layer covering the metal raw tube. The heater 110, the holder 120, and the stay 130 are disposed on an inner side of the belt 140.

The pressure roller 82 includes a metal shaft 82A serving as a rotation shaft, and an elastic layer 82B covering the shaft 82A. The belt 140 is nipped between the pressure roller 82 and the heater 110 to form a nip portion NP for heating and pressurizing the sheet S.

The pressure roller 82 is driven and rotated by a driving force transmitted from a motor, not illustrated, provided in the housing 2. When the pressure roller 82 is driven, the belt 140 is rotated by a frictional force between the pressure roller 82 and the belt 140 (or the sheet S). As a result, the sheet S to which the toner image is transferred is conveyed between the pressure roller 82 and the heated belt 140, whereby the toner image is heat-fixed.

Figure 3:
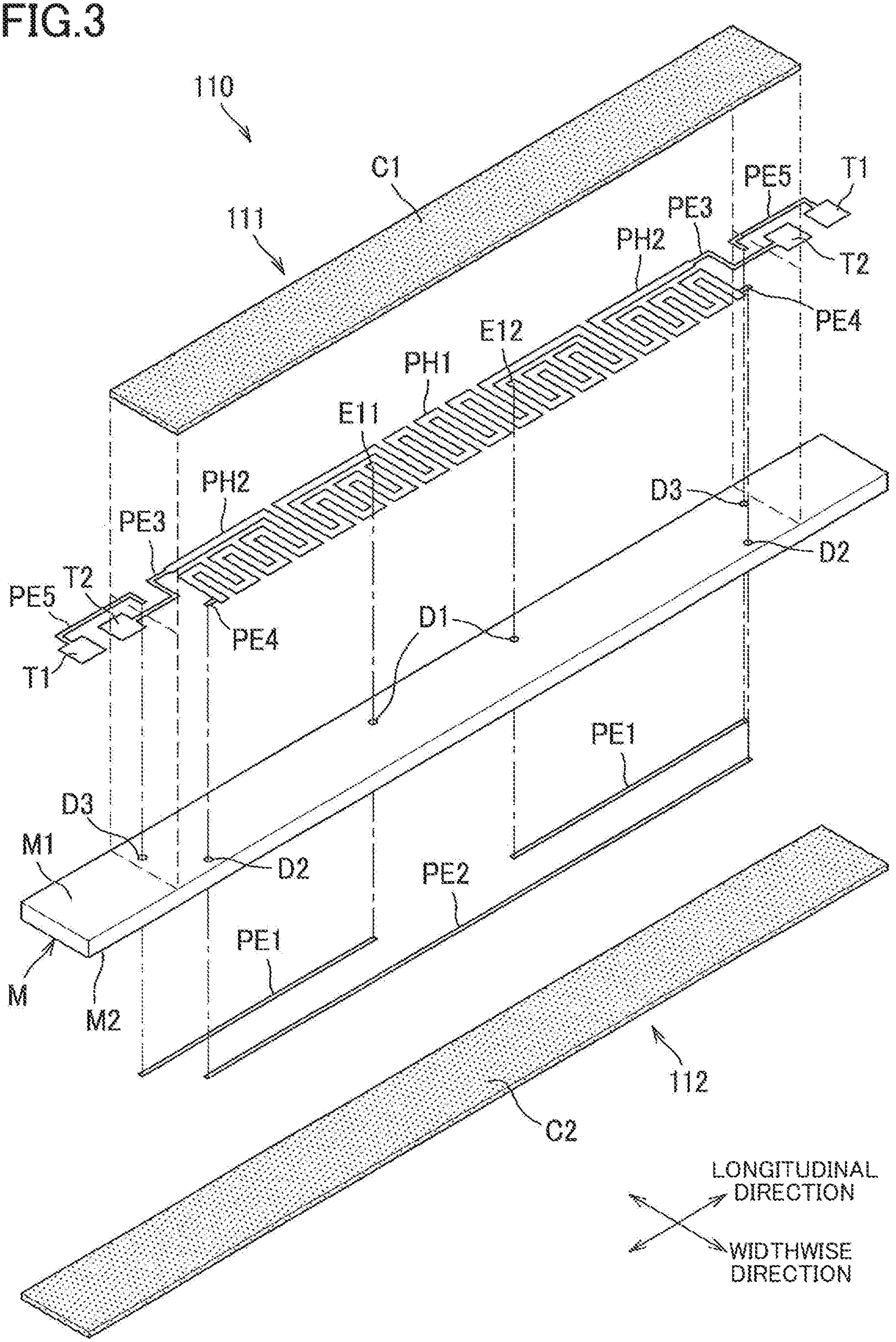
FIG. 3 is an exploded perspective view of a heater.

As illustrated in FIG. 3, the heater 110 includes a substrate M, a first heating pattern PH1, second heating patterns PH2, first terminals T1, second terminals T2, first power-supply patterns PE1, a second power-supply pattern PE2, a first protecting layer C1, and a second protecting layer C2.

The substrate M is an elongated flat plate formed of an insulating material such as an ceramic material. The substrate M has a first surface M1 and a second surface M2 orthogonal to a direction in which the heating unit 81 or the pressure roller 82 urges. Each of the first surface M1 and the second surface M2 is a rectangular flat surface elongated in the longitudinal direction of the substrate M. The first surface M1 is located on one of opposite sides of the substrate M in its thickness direction, while the second surface M2 is located on the other of the opposite sides of the substrate M in its thickness direction, that is, the second surface M2 is located on an opposite side of the substrate M from the first surface M1 in the thickness direction. In the present embodiment, the heater 110 is disposed such that the first surface M1 of the substrate M faces toward the pressure roller 82.

The first heating pattern PH1, the second heating patterns PH2, the first terminals T1, and the second terminals T2 are arranged on a first-surface-M1 side of the substrate M. In the present embodiment, specifically, the first heating pattern PH1, the second heating patterns PH2, the first terminals T1, and the second terminals T2 are formed on the first surface M1 of the substrate M.

Each of the first heating pattern PH1 and the second heating patterns PH2 is a heating resistor that generates heat when energized. The first heating pattern PH1 is disposed on a central portion of the substrate M in its longitudinal direction.

Figure 4A:
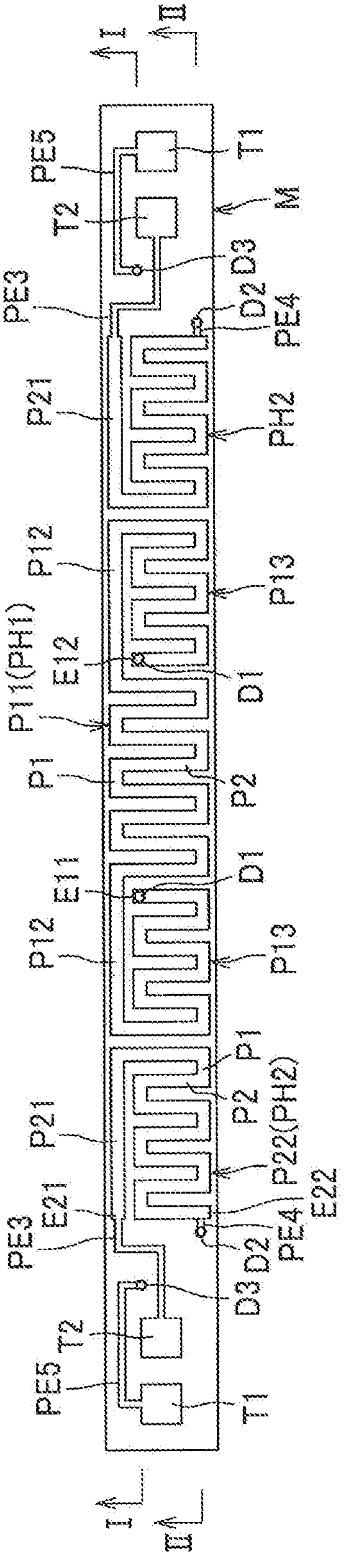
FIG. 4A is a plan view of patterns and so on formed on a substrate, viewed from a first-surface side.

As illustrated in FIG. 4A, the first heating pattern PH1 is a linear pattern having one end portion E11 and the other end portion E12 and bent to achieve high density in the widthwise direction and the longitudinal direction of the surface of the substrate M. Specifically, the first heating pattern PH1 includes: first portions P1 each extending in the longitudinal direction as one example of a first direction; and second portions P2 each extending in the widthwise direction as one example of a second direction.

More specifically, the first heating pattern PH1 includes a first bellows-shape pattern P11, two straight patterns P12, and two second bellows-shape patterns P13. The first bellows-shape pattern P11 includes the first portions P1 and the second portions P2 arranged alternately and extends in a bellows shape in the longitudinal direction over a region extending from one end to the other end of the substrate M in the widthwise direction.

Each of the straight patterns P12 is constituted by a corresponding one of the first portions P1 and located at the one end portion of the substrate M in the widthwise direction, and extends outward in the longitudinal direction from a corresponding one of opposite end portions of the first bellows-shape pattern P11 in the longitudinal direction. Each of the second bellows-shape patterns P13 includes the first portions P1 and the second portions P2 arranged alternately and extends in a bellows shape in the longitudinal direction from an outer end portion of a corresponding one of the straight patterns P12 in the longitudinal direction, toward the first bellows-shape pattern P11 in a region extending between the straight pattern P12 and the other end of the substrate M in the widthwise direction.

End portions of the respective second bellows-shape patterns P13 which are nearer to the first bellows-shape pattern P11 are the one end portion E11 and the other end portion E12 of the first heating pattern PH1, respectively. The one end portion E11 and the other end portion E12 of the first heating pattern PH1 are connected respectively to first electrically-continuous portions D1 which will be described below.

The second heating patterns PH2 are formed respectively on two regions, between which the first heating pattern PH1 is interposed in the longitudinal direction. That is, the two second heating patterns PH2 are located respectively at positions each different from the position of the first heating pattern PH1 in the longitudinal direction of the substrate M. In other words, a region in which the second heating patterns PH2 are formed in the longitudinal direction of the substrate M does not overlap a region in which the first heating pattern PH1 is formed in the longitudinal direction. Furthermore, in other words, in the case where the first heating pattern PH1 is disposed at the center of the substrate M in the longitudinal direction, the opposite ends of the first heating pattern PH1 in the longitudinal direction are nearer to the center of the substrate M in the longitudinal direction than the two second heating patterns PH2. Each of the two second heating patterns PH2 is disposed apart from the first heating pattern PH1 in the longitudinal direction.

Each of the second heating patterns PH2 is a linear pattern having one end portion E21 and the other end portion E22 and bent to achieve high density in the widthwise direction and the longitudinal direction of the surface of the substrate M. Specifically, each of the second heating patterns PH2 includes: the first portions P1 each extending in the longitudinal direction as one example of the first direction; and the second portions P2 each extending in the widthwise direction as one example of the second direction.

Each of the second heating patterns PH2 includes a straight pattern P21 and a bellows-shape pattern P22. The straight pattern P21 is constituted by a corresponding one of the first portions P1 and located at the one end portion of the substrate M in the widthwise direction. The bellows-shape pattern P22 includes the first portions P1 and the second portions P2 arranged alternately and extends in a bellows shape in the longitudinal direction from one of opposite end portions of the straight pattern P21 which is nearer to the first heating pattern PH1 than the other, toward a corresponding one of the second terminals T2 in a region extending between the straight pattern P21 and the other end of the substrate M in the widthwise direction.

One end portion of the straight pattern P21 and one of opposite end portions of the bellows-shape pattern P22 which is nearer to the second terminal T2 than the other are the one end portion E21 and the other end portion E22 of the second heating pattern PH2, respectively. The one end portions E21 of the respective second heating patterns PH2 are connected to the respective second terminals T2 via respective power-supply patterns PE3. The other end portions E22 of the respective second heating patterns PH2 are connected to respective second electrically-continuous portions D2 which will be described below via respective power-supply patterns PE4.

Here, the laser printer 1 according to the present embodiment conveys the sheet S such that the center of the sheet S in the widthwise direction is aligned with the center of the substrate M in the longitudinal direction. The dimension of the first heating pattern PH1 in the longitudinal direction corresponds to the width of a first sheet having a relatively small width. The dimension from one end of one of the second heating patterns PH2 in the longitudinal direction which is nearer to one end of the substrate M than the other in the longitudinal direction, to the other end of the other of the second heating patterns PH2 in the longitudinal direction which is nearer to the other end of the substrate M than the one in the longitudinal direction corresponds to the width of a second sheet that is wider than the first sheet.

The first terminals T1 receive electricity that is to be supplied to the first heating pattern PH1 and are provided respectively at the opposite end portions of the substrate M in the longitudinal direction. Each of the first terminals T1 is located on an opposite side of a corresponding one of the second heating patterns PH2 from the first heating pattern PH1 in the longitudinal direction. In other words, each of the first terminals T1 is disposed at such a position that a corresponding one of the two second heating patterns PH2 is interposed between the first terminal T1 and the first heating pattern PH1 in the longitudinal direction of the substrate M. The first terminals T1 are connected to respective third electrically-continuous portions D3 which will be described below via respective power-supply patterns PE5.

The second terminals T2 receive electricity that is to be supplied to the respective second heating patterns PH2 and are provided respectively at the opposite end portions of the substrate M in the longitudinal direction. That is, each of the two second terminals T2 is disposed at such a position that a corresponding one of the two second heating patterns PH2 is interposed between the second terminal T2 and the first heating pattern PH1 in the longitudinal direction of the substrate M. Furthermore, specifically, each of the second terminals T2 is located between a corresponding one of the first terminals T1 and a corresponding one of the second heating patterns PH2 in the longitudinal direction.

It is noted that each of the terminals T1, T2 is connectable to a connector, not illustrated, to be connected to a power source, not illustrated, in the housing 2 via the connector.

As illustrated in FIGS. 3 and 4A, the two first electrically-continuous portions D1, the two second electrically-continuous portions D2, and the two third electrically-continuous portions D3 are formed in the substrate M. Each of the first electrically-continuous portions D1, the second electrically-continuous portions D2, and the third electrically-continuous portions D3 is formed of a conductive material and extends through the substrate M in its thickness direction. Specifically, each of the electrically-continuous portions D1-D3 is formed in a corresponding one of through holes each formed through the substrate M in the thickness direction and extends from the first surface M1 to the second surface M2 of the substrate M.

Each of the two first electrically-continuous portions D1 electrically connects the first heating pattern PH1 and a corresponding one of the first power-supply patterns PE1 (see FIG. 4B), which will be described below, to each other, and is located at a position corresponding to one of the one end portion E11 and the other end portion E12 of the first heating pattern PH1. Specifically, each of the first electrically-continuous portions D1 is connected to a corresponding one of portions of the first heating pattern PH1 which is farther in the longitudinal direction from a corresponding one of the second heating patterns PH2 than a portion of the first heating pattern PH1 which is nearest to the second heating pattern PH2 in the longitudinal direction. The first electrically-continuous portions D1 are located on an inner side of the outermost portions of the first heating pattern PH1 in the widthwise direction of the substrate M.

Each of the second electrically-continuous portions D2 electrically connects a corresponding one of the second heating patterns PH2 and the second power-supply pattern PE2 (see FIG. 4B), which will be described below, to each other, and is located at a position corresponding to an end portion of the power-supply pattern PE4 connected to the other end portion E22 of a corresponding one of the second heating patterns PH2. Each of the third electrically-continuous portions D3 is located at a position corresponding to an end portion of the power-supply pattern PE5 connected to a corresponding one of the first terminals T1.

The first electrically-continuous portions D1 and the third electrically-continuous portions D3 are arranged at a first position in the widthwise direction. The second electrically-continuous portions D2 are arranged at a second position different from the first position in the widthwise direction.

The first power-supply patterns PE1 and the second power-supply pattern PE2 are arranged on a second-surface-M2 side of the substrate M. In the present embodiment, specifically, the first power-supply patterns PE1 and the second power-supply pattern PE2 are formed on the second surface M2 of the substrate M.

Figure 4B:
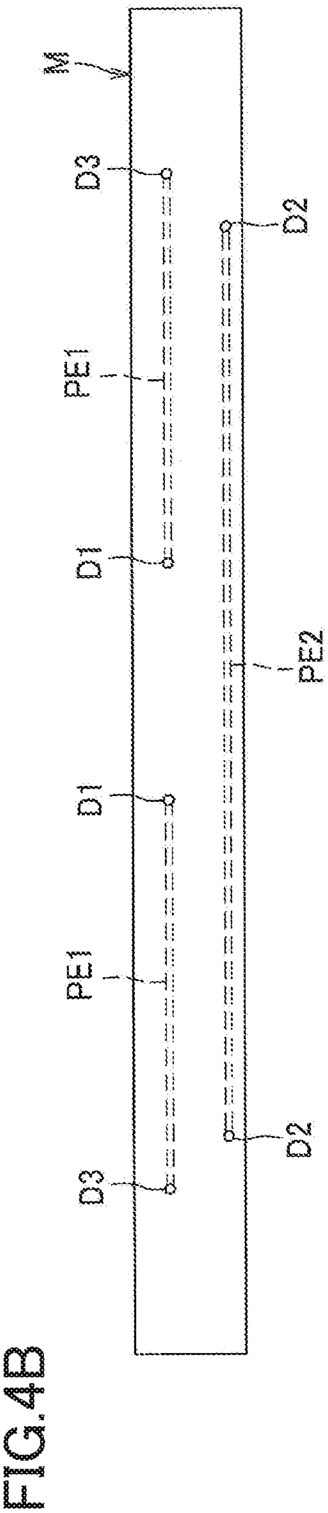
FIG. 4B is a plan view of the substrate viewed from the first-surface side without the patterns and so on formed on a first surface of the substrate.

As illustrated in FIG. 4B, each of the first power-supply patterns PE1 electrically connects a corresponding one of the first terminals T1 and the first heating pattern PH1 to each other, and are arranged on a straight line extending in the longitudinal direction. Here, FIG. 4B is a view of the substrate M viewed from the first-surface-M1 side, illustrating a state in which the patterns such as the first heating pattern PH1 are not formed on the first surface M1.

The two first power-supply patterns PE1 are provided respectively on opposite sides of the center of the substrate M in the longitudinal direction. The first power-supply pattern PE1 located on one side extends from the first electrically-continuous portion D1 to the third electrically-continuous portion D3 on the one side of the center of the substrate M in the longitudinal direction and is connected to the first electrically-continuous portion D1 and the third electrically-continuous portion D3. Likewise, the first power-supply pattern PE1 on the other side is connected to the first electrically-continuous portion D1 and the third electrically-continuous portion D3 on the other side.

The second power-supply pattern PE2 electrically connects the two second heating patterns PH2 to each other and are arranged on a straight line extending in the longitudinal direction. One end portion of the second power-supply pattern PE2 is connected to one of the second electrically-continuous portions D2, while the other end portion of the second power-supply pattern PE2 is connected to the other of the second electrically-continuous portions D2.

Each of the power-supply patterns PE1-PE5 and the terminals T1, T2 is formed of a conductive material having a resistance value that is less than that of each of the heating patterns PH1, PH2.

Figure 5:
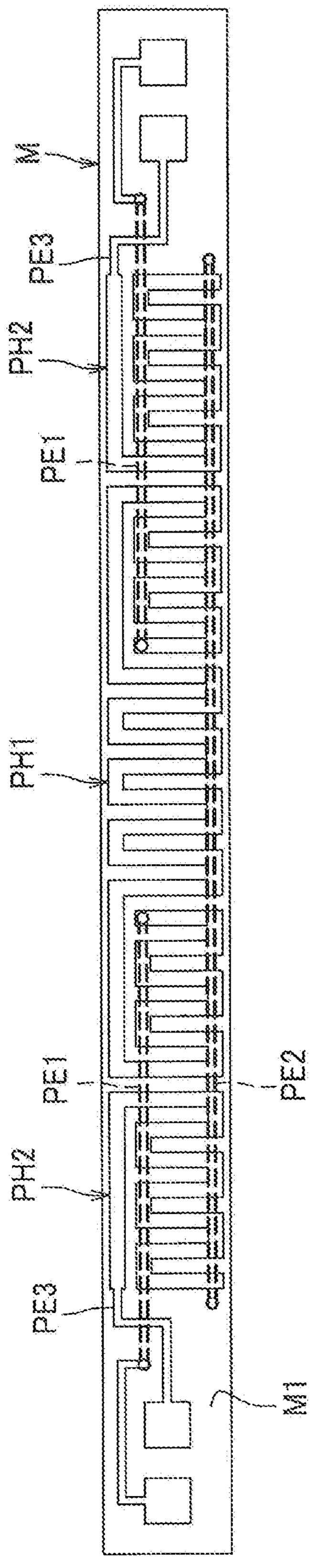
FIG. 5 is a view of relationship between heating patterns on the first surface and power-supply patterns on a second surface of the substrate.

As illustrated in FIG. 5, when projected in a direction orthogonal to the first surface M1, each of the first power-supply patterns PE1 overlaps the power-supply patterns PE3, a corresponding one of the second heating patterns PH2, and the first heating pattern PH1. When projected in the direction orthogonal to the first surface M1, the second power-supply pattern PE2 overlaps the two second heating patterns PH2 and the first heating pattern PH1.

Figure 6A:
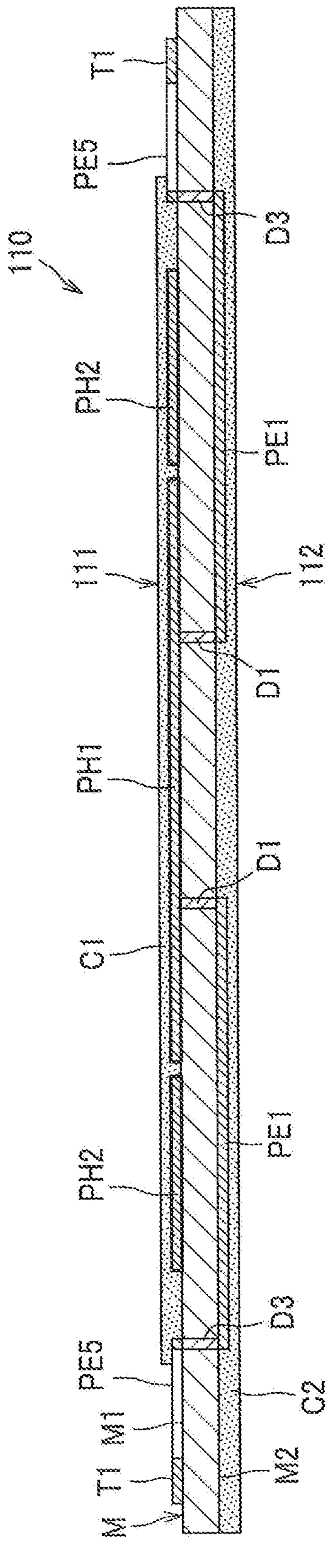
FIG. 6A is a cross-sectional view taken along line I-I in FIG. 4A.

As illustrated in FIG. 3, each of the first protecting layer C1 and the second protecting layer C2 is formed of an insulating material such as a glass material. The first protecting layer C1 is shorter than the substrate M in the longitudinal direction. The first protecting layer C1 is formed so as to cover the first heating pattern PH1 and the two second heating patterns PH2 and expose the terminals T1, T2. The second protecting layer C2 is formed so as to cover the two first power-supply patterns PE1 and the second power-supply pattern PE2. One of opposite surfaces of the heater 110 on which the first protecting layer C1 is formed is defined as a first outer surface 111, and the other surface on which the second protecting layer C2 is formed is defined as a second outer surface 112 (also see FIGS. 6A and 6B).

As illustrated in FIG. 2, the fixing device 8 is configured such that the first outer surface 111 of the heater 110 contacts the belt 140. The second outer surface 112 of the heater 110 contacts and is supported by the heater supporting surface 122 of the holder 120. The longitudinal direction of the substrate M coincides with the direction of the rotation axis of the pressure roller 82, i.e., the direction in which the shaft 82A extends. The widthwise direction of the substrate M coincides with the conveying direction of the sheet S at the nip portion NP and with the direction in which the belt 140 moves at the nip portion NP.

Figure 6B:
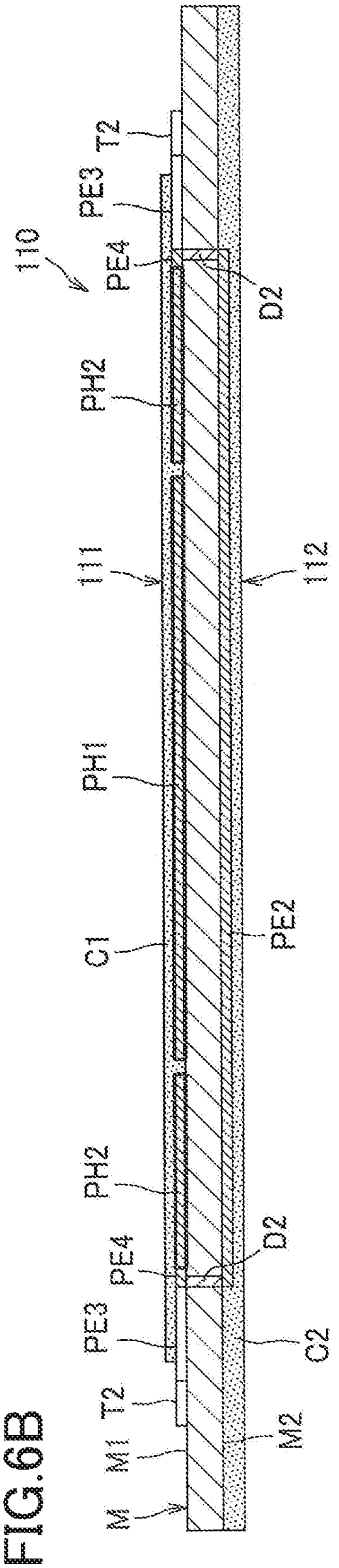
FIG. 6B is a cross-sectional view taken along line II-II in FIG. 4A.

In the heater 110 configured as described above, as illustrated in FIG. 6A, the first terminals T1 provided on the first surface M1 are connected to the first heating pattern PH1 provided on the first surface M1, via the respective power-supply patterns PE5 provided on the first surface M1, the respective third electrically-continuous portions D3, the respective first power-supply patterns PE1 provided on the second surface M2, and the respective first electrically-continuous portions D1. For simplicity, FIGS. 6A and 6B simply illustrate the heating patterns PH1, PH2 each having a bellows shape. FIG. 6B omits illustration of members or portions not to be described, to emphasize illustration of the portions connecting the second heating patterns PH2.

That is, conductive portions (PE5, D3, PE1, D1) each connecting a corresponding one of the first terminals T1 and the first heating pattern PH1 to each other are formed so as to take a detour to avoid the respective second heating patterns PH2 provided on the first surface M1. Specifically, the conductive portion (PE5, D3, PE1, D1) is connected to the first heating pattern PH1 by first extending on the first surface M1 from the first terminal T1, then extending to and in the second surface M2, and finally returning to the first surface M1.

As illustrated in FIG. 6B, one of the second heating patterns PH2 provided on the first surface M1 is connected to the other via one of the power-supply patterns PE4 provided on the first surface M1, one of the second electrically-continuous portions D2, the second power-supply pattern PE2 provided on the second surface M2, the other of the second electrically-continuous portions D2, and the other of the power-supply patterns PE4 provided on the first surface M1. That is, the conductive portion (PE4, D2, PE2, D2, PE4) connecting the two second heating patterns PH2 to each other is formed so as to take a detour to avoid the first heating pattern PH1 provided on the first surface M1. Specifically, the conductive portion (PE4, D2, PE2, D2, PE4) is connected to the other second heating pattern PH2 by first extending from the one second heating pattern PH2 onto the first surface M1, then extending to and in the second surface M2, and finally returning to the first surface M1.

The above-described configuration achieves the following effects. Since the first power-supply patterns PE1 are provided on the second surface M2 that is located on an opposite side of the substrate M from the first surface M1 on which the second heating patterns PH2 are provided, the first power-supply patterns PE1 do not hinder forming of the second heating patterns PH2, ensuring a large area of each of the second heating patterns PH2 over a region extending from the one end to the other end of the substrate M in the widthwise direction.

Each of the first heating pattern PH1 and the second heating patterns PH2 includes the first portions P1 each extending in the longitudinal direction, and the second portions P2, making it possible to effectively use the area of the first surface M1 of the substrate M to ensure a large area of each of the heating patterns PH1, PH2 in a region extending from the one end to the other end of the substrate M in the widthwise direction.

Each of the first electrically-continuous portions D1 generates a smaller amount of heat than each of the heating patterns PH1, PH2, and an amount of heat generated at a boundary region between the first heating pattern PH1 and each of the second heating patterns PH2 is small. Thus, if the first electrically-continuous portions D1 are disposed near the respective boundary regions, the amount of heat generated at each of the boundary regions becomes much smaller. In the configuration of the above-described embodiment, in contrast, the first electrically-continuous portions D1 are far from the respective second heating patterns PH2, that is, the first electrically-continuous portions D1 are far from the respective boundary region, thereby preventing reduction in the amount of heat generated at each of the boundary regions.

Heat easily escapes at the end portions of the substrate M in the widthwise direction. Thus, if the first electrically-continuous portions D1 are disposed at an outermost portion of the first heating pattern PH1 in the widthwise direction, an amount of heat generated at the end portion of the substrate M in the widthwise direction is smaller. In the configuration of the above-described embodiment, in contrast, the first electrically-continuous portions D1 are disposed on an inner side of the outermost portion of the first heating pattern PH1 in the widthwise direction, thereby preventing reduction in the amount of heat generated at the end portion of the substrate M in the widthwise direction.

Since the second power-supply pattern PE2 is provided on the second surface M2 that is located on an opposite side of the substrate M from the first surface M1 on which the first heating pattern PH1 is provided, the second power-supply pattern PE2 does not hinder forming of the first heating pattern PH1, ensuring a large area of the first heating pattern PH1 over a region extending from the one end to the other end of the substrate M in the widthwise direction.

While the embodiment has been described above, it is to be understood that the disclosure is not limited to the details of the illustrated embodiment, but may be embodied with various changes and modifications, which may occur to those skilled in the art, without departing from the spirit and scope of the disclosure. It is noted that the same reference numerals as used in the above-described embodiment are used to designate the corresponding elements of the following modifications, and an explanation of which is dispensed with.

While the substrate M is formed of an insulating material in the above-described embodiment, the present disclosure is not limited to this configuration. For example, the substrate M may be formed of a conductive material such as metal, e.g., stainless steel. In this case, a heater 210 illustrated in FIG. 7 may be configured, for example.

Figure 7:
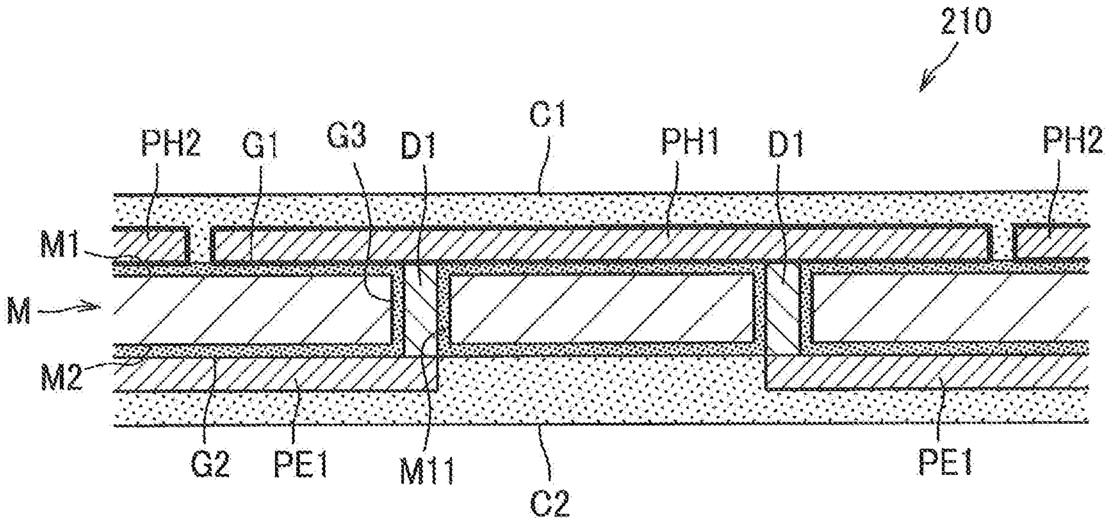
FIG. 7 is a cross-sectional view of a heater according to a first modification.

In the heater 210 illustrated in FIG. 7, specifically, the substrate M has holes M11 each extending through the substrate M in the thickness direction. A first insulating layer G1 formed of an insulating material is formed between the first surface M1 of the substrate M and the first heating pattern PH1. Specifically, the first insulating layer G1 is formed between the first surface M1 and each of the terminals and the patterns arranged on the first surface M1.

A second insulating layer G2 formed of an insulating material is formed between the second surface M2 of the substrate M and the first power-supply patterns PE1. Specifically, the second insulating layer G2 is formed between the second surface M2 and the first power-supply patterns PE1 and the second power-supply pattern PE2 disposed on the second surface M2.

Third insulating layers G3 each formed of an insulating material are formed on inner circumferential surfaces of the respective holes M11. Each of the third insulating layers G3 has a cylindrical shape extending along the inner circumferential surface of a corresponding one of the holes M11. The first electrically-continuous portions D1 each formed of a conductive material are formed on an inner side of the respective third insulating layers G3. That is, the first electrically-continuous portions D1 are located in the respective holes M11, and each of the third insulating layers G3 is formed between a corresponding one of the first electrically-continuous portions D1 and the inner circumferential surface of a corresponding one of the holes M11. It is noted that another configuration of the substrate M around each of electrically-continuous portion is similar to that of the substrate M around each of the first electrically-continuous portions D1, and an explanation of which is dispensed with.

Also in this modification, the first power-supply patterns PE1 and the second power-supply pattern PE2 are provided on the second surface M2 that is located on an opposite side of the substrate M from the first surface M1 on which the heating patterns PH1, PH2 are provided, thereby achieving effects similar to those achieved in the above-described embodiment.

Figure 8:
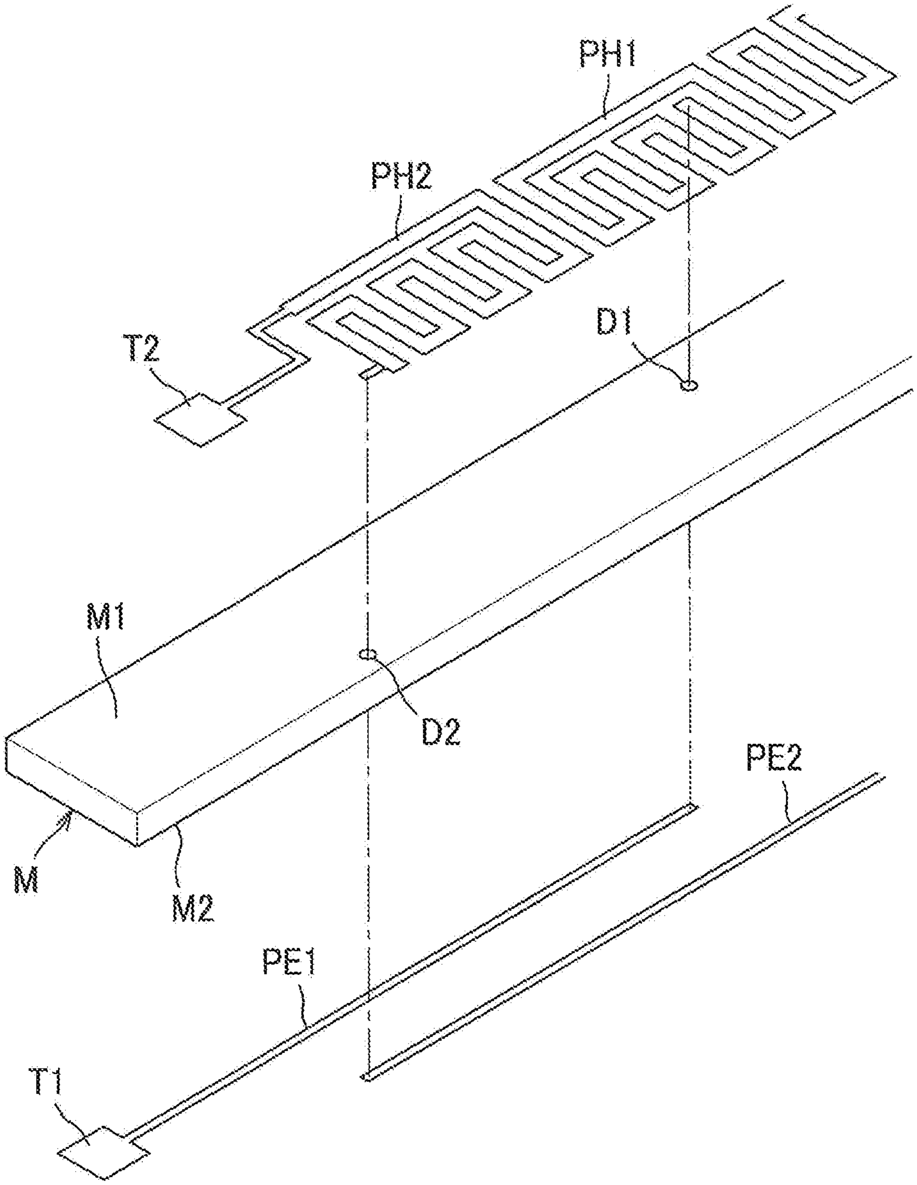
FIG. 8 is an exploded perspective view of a heater according to a second modification.

While the first terminals T1 are provided on the first-surface-M1 side of the substrate M in the above-described embodiment, the present disclosure is not limited to this configuration. For example, as illustrated in FIG. 8, the first terminals T1 may be provided on the second-surface-M2 side of the substrate M. In this modification, the first terminals T1 are directly connected to the respective first power-supply patterns PE1, eliminating the need of the power-supply patterns PE5 and the third electrically-continuous portions D3 provided in the above-described embodiment, resulting in a simpler configuration of the heater 110.

While the longitudinal direction is one example of the first direction, and the widthwise direction is one example of the second direction in the above-described embodiment, the present disclosure is not limited to this configuration. For example, the first direction may be a direction inclined with respect to the longitudinal direction, and the second direction may be a direction inclined with respect to the widthwise direction.

While the two second heating patterns PH2 are provided on opposite sides of the first heating pattern PH1 in the above-described embodiment, the present disclosure is not limited to this configuration. For example, a single second heating pattern may be provided. Specifically, in a configuration in which the sheet is conveyed with respect to one end of the sheet in the widthwise direction, the heater may be configured such that a single first heating pattern is disposed so as to correspond to the first sheet having a small width, and a single second heating pattern is disposed so as to correspond to the second sheet that is wider than the first sheet.

Figure 9A:
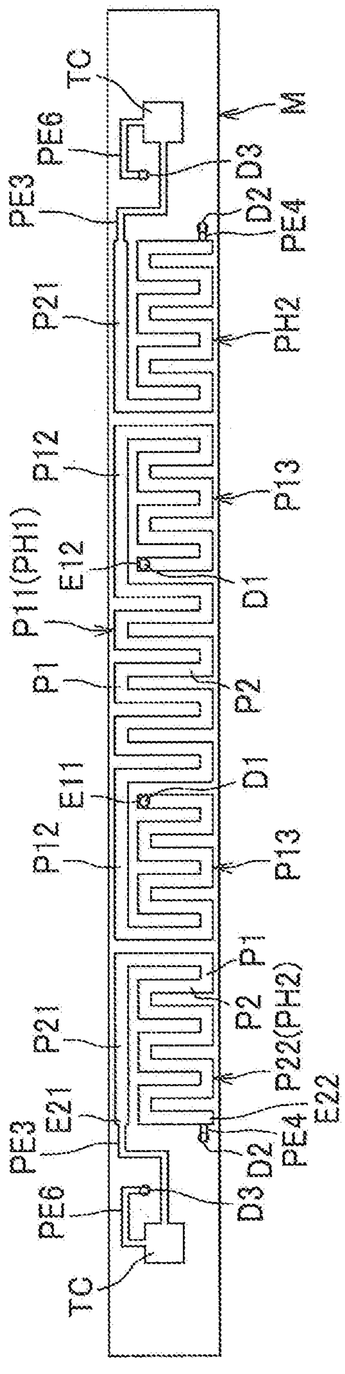
FIGS. 9A and 9B are plan views of a heater according to a third modification.
Figure 9B:
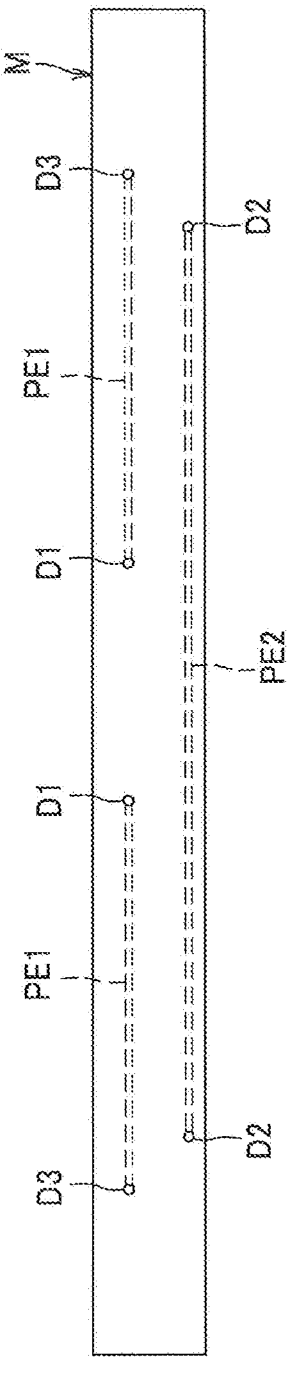

While the first terminal T1 for supplying electricity to the first heating pattern PH1 and the second terminal T2 for supplying electricity to the second heating pattern PH2 are different terminals in the above-described embodiment, the present disclosure is not limited to this configuration. For example, as illustrated in FIGS. 9A and 9B, a first terminal for supplying electricity to the first heating pattern PH1 and a second terminal for supplying electricity to the second heating pattern PH2 may be formed as a common terminal TC.

In this modification, specifically, each of the terminals TC provided on the respective opposite end portions of the substrate M in the longitudinal direction has a configuration similar to that of each of the second terminals T2 in the above-described embodiment. In this modification, the first terminals T1 are removed from the configuration in the above-described embodiment, and the third electrically-continuous portions D3 are connected to the respective terminals TC via respective power-supply patterns PE6.

In this configuration, the terminals TC are connected to the first heating pattern PH1 via respective conductive portions (PE6, D3, PE1, D1) and connected to the respective second heating patterns PH2 via the respective power-supply patterns PE3. This configuration reduces the number of the terminals, resulting in a simpler configuration of the heater 110.

Figure 10A:
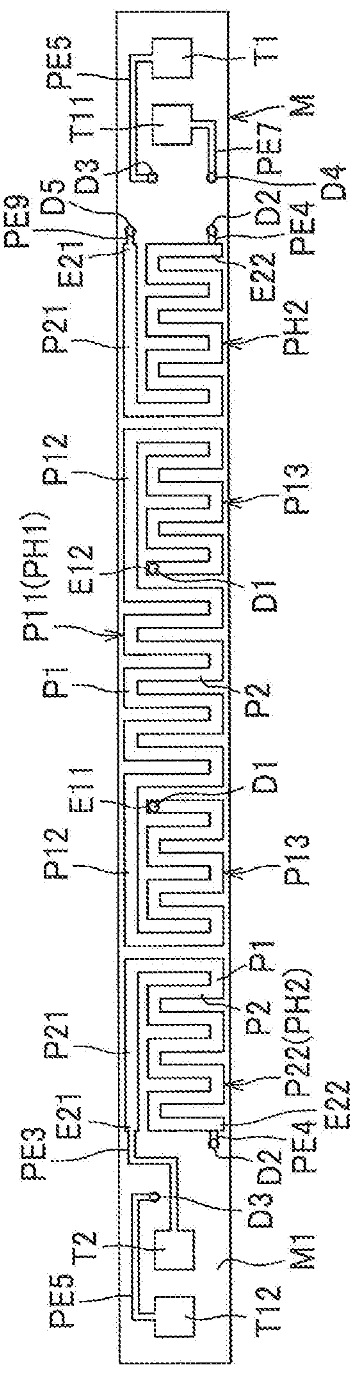
FIGS. 10A and 10B are plan views of a heater according to a fourth modification.
Figure 10B:
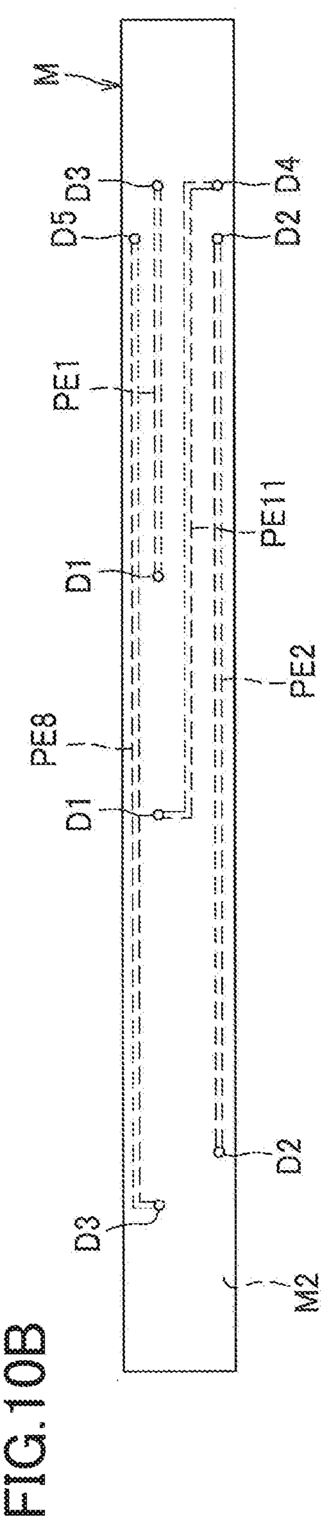

While the first terminal T1 and the second terminal T2 are provided at each of the opposite end portions of the substrate M in the longitudinal direction in the above-described embodiment, the present disclosure is not limited to this configuration. For example, as illustrated in FIGS. 10A and 10B, the second terminal T2 and a second terminal T12 are provided at one end portion of the substrate M in the longitudinal direction, and the first terminal T1 and a first terminal T11 are provided at the other end portion of the substrate M in the longitudinal direction.

In this modification, specifically, power-supply patterns PE7-PE9 each formed of a conductive material, a fourth electrically-continuous portion D4 and a fifth electrically-continuous portion D5, and a first power-supply pattern PE11 are provided on the substrate M. The power-supply patterns PE7-PE9, and the fourth electrically-continuous portion D4 and the fifth electrically-continuous portion D5 are not included in the configuration in the above-described embodiment. The first power-supply pattern PE11 is different from the first power-supply pattern provided in the above-described embodiment. The first terminal T11, the second terminal T12, and the power-supply patterns PE7, PE9 are disposed on the first surface M1 of the substrate M.

The power-supply pattern PE8 and the first power-supply pattern PE11 are disposed on the second surface M2 of the substrate M. When projected in the direction orthogonal to the first surface M1, the power-supply pattern PE8 overlaps the power-supply patterns PE5, PE3, PE9, the two second heating patterns PH2, and the first heating pattern PH1. When projected in the direction orthogonal to the first surface M1, the first power-supply pattern PE11 overlaps the first heating pattern PH1 and one of the second heating patterns PH2 which is nearer to the other end of the substrate M than the other in the longitudinal direction. Each of the fourth electrically-continuous portion D4 and the fifth electrically-continuous portion D5 extends from the first surface M1 to the second surface M2 of the substrate M.

The first terminal T11 is located between the first terminal T1 and the second heating pattern PH2 in the longitudinal direction. The first terminal T11 is connected to the fourth electrically-continuous portion D4 via the power-supply pattern PE7. The first power-supply pattern PE11, on the second surface M2 of the substrate M, connects between the fourth electrically-continuous portion D4 and the first electrically-continuous portion D1 connected to the one end portion E11 of the first heating pattern PH1.

Thus, the first terminal T11 is connected to the one end portion E11 of the first heating pattern PH1 via a conductive portion (PE7, D4, PE11, D1). It is noted that the first terminal T1 is connected to the other end portion E12 of the first heating pattern PH1 via the same components and portions (PE5, D3, PE1, D1) provided in the above-described embodiment.

The second terminal T12 is disposed on an outer side of the second terminal T2 in the longitudinal direction and connected to one of the third electrically-continuous portions D3 via one of the power-supply patterns PE5. The power-supply pattern PE8, on the second surface M2 of the substrate M, connects the third electrically-continuous portion D3 and the fifth electrically-continuous portion D5 to each other. The power-supply pattern PE9, on the first surface M1 of the substrate M, connects between the fifth electrically-continuous portion D5 and the one end portion E21 of the one of the second heating patterns PH2 which is nearer to the other end of the substrate M than the other in the longitudinal direction.

Thus, the second terminal T12 is connected via a conductive portion (PE5, D3, PE8, D5, PE9) to the one of the second heating patterns PH2 which is nearer to the other end of the substrate M than the other in the longitudinal direction. It is noted that the second terminal T2 is connected, via the same component (PE3) provided in the above-described embodiment, to the other of the second heating patterns PH2 which is nearer to the one end of the substrate M than the one in the longitudinal direction.

While the protecting layers C1, C2 are provided in the above-described embodiment, the present disclosure is not limited to this configuration, and the protecting layers C1, C2 may not be provided. That is, the heating pattern or the first power-supply pattern may contact the belt, for example.

While the first outer surface 111 of the heater 110 on which the heating patterns PH1, PH2 are formed is in contact with the belt 140 in the above-described embodiment, the present disclosure is not limited to this configuration. For example, the second outer surface 112 of the heater 110 on which the heating patterns PH1, PH2 are not formed (the surface of the second protecting layer C2 in the above-described embodiment) may contact the belt 140.

The elements in the above-described embodiment and the modifications may be combined as needed.

What is claimed is:

1. A heater, comprising:

a substrate comprising a first surface and a second surface located opposite to the first surface relative to the substrate;

a first heating pattern constituted by a heating resistor and disposed on a first-surface side of the substrate;

a second heating pattern constituted by a heating resistor, disposed on the first-surface side of the substrate, and located at a position that is different from a position of the first heating pattern in a longitudinal direction of the substrate;

a first terminal to which electricity is to be supplied, the first terminal being disposed such that the second heating pattern is interposed between the first terminal and the first heating pattern in the longitudinal direction of the substrate;

a first power-supply pattern electrically connecting the first terminal and the first heating pattern to each other and disposed on a second-surface side of the substrate; and a first electrical connector extending through the substrate and electrically connecting the first power-supply pattern and the first heating pattern to each other, wherein the first heating pattern and the second heating pattern each comprise a first portion extending in a first direction, and a second portion extending in a second direction different from the first direction, wherein the first electrical connector is located on an inner side of an outermost portion of the first heating pattern in a widthwise direction of the substrate that is orthogonal to the longitudinal direction and parallel to the first surface of the substrate, wherein the first electrical connector is disposed such that the second heating pattern is interposed between the first electrical connector and the first terminal in the longitudinal direction, wherein the first electrical connector is located between a first outermost portion of the first heating pattern and a second outermost portion of the first heating pattern in the widthwise direction, the first outermost portion of the first heating pattern being closer to a first end of the substrate than to a second end of the substrate in the widthwise direction, the second outermost portion of the first heating pattern in the widthwise direction being closer to the second end of the substrate than to the first end of the substrate in the widthwise direction, wherein the first heating pattern includes:

a first heating line extending in the widthwise direction of the substrate;

a second heating line extending in the widthwise direction of the substrate and spaced away from the first heating line in the longitudinal direction of the substrate;

a third heating line extending in the longitudinal direction of the substrate; and a fourth heating line extending in the longitudinal direction of the substrate and spaced away from the third heating line in the widthwise direction of the substrate, and wherein the first electrical connector is located between the first heating line and the second heating line, the first electrical connector being located between the third heating line and the fourth heating line.

2. The heater according to claim 1, wherein a region in which the second heating pattern is formed in the longitudinal direction does not overlap a region in which the first heating pattern is formed in the longitudinal direction.

3. The heater according to claim 1, wherein when projected in a direction orthogonal to the first surface, the second heating pattern overlaps the first power-supply pattern.

4. The heater according to claim 1, wherein the first electrical connector is connected to a portion of the first heating pattern which is farther from the second heating pattern than a portion of the first heating pattern which is nearest to the second heating pattern in the longitudinal direction.

5. The heater according to claim 1, further comprising:

two second heating patterns each as the second heating pattern, the two second heating patterns being formed respectively at two regions, between which the first heating pattern is interposed in the longitudinal direction;

a second power-supply pattern electrically connecting the two second heating patterns, formed respectively at the two regions, to each other and disposed on the second-surface side of the substrate; and a second electrical connector extending through the substrate and electrically connecting the second power-supply pattern and each of the two second heating patterns to each other.

6. The heater according to claim 5, further comprising two first terminals each as the first terminal, wherein each of the two first terminals is disposed such that a corresponding one of the two second heating patterns is interposed between the first heating pattern and said each of the two first terminals in the longitudinal direction.

7. The heater according to claim 5, wherein when projected in a direction orthogonal to the first surface, the first heating pattern overlaps the second power-supply pattern.

8. The heater according to claim 5, further comprising a second terminal configured to supply electricity to a corresponding one of the two second heating patterns and disposed such that the corresponding one of the two second heating patterns is interposed between the first heating pattern and the second terminal in the longitudinal direction.

9. The heater according to claim 1, wherein the substrate comprises a hole in which the first electrical connector, formed of a conductive material, is located, and wherein the heater further comprises a first insulating layer formed between the first surface and the first heating pattern, a second insulating layer formed between the second surface and the first power-supply pattern, and a third insulating layer formed between the first electrical connector and an inner circumferential surface of the hole.

10. The heater according to claim 1, wherein the first terminal is disposed on the second-surface side of the substrate.

11. A heater, comprising:

a substrate comprising a first surface and a second surface located opposite to the first surface relative to the substrate;

a first heating pattern constituted by a heating resistor and disposed on a first-surface side of the substrate;

a second heating pattern constituted by a heating resistor, disposed on the first-surface side of the substrate, and located at a position that is different from a position of the first heating pattern in a longitudinal direction of the substrate;

a first terminal to which electricity is to be supplied, the first terminal being disposed such that the second heating pattern is interposed between the first terminal and the first heating pattern in the longitudinal direction of the substrate;

a first power-supply pattern electrically connecting the first terminal and the first heating pattern to each other and disposed on a second-surface side of the substrate;

a first electrical connector extending through the substrate and electrically connecting the first power-supply pattern and the first heating pattern to each other;

two second heating patterns each as the second heating pattern, the two second heating patterns being formed respectively at two regions, between which the first heating pattern is interposed in the longitudinal direction;

a second power-supply pattern electrically connecting the two second heating patterns formed respectively at the two regions, to each other, not electrically connected to the first heating pattern and disposed on the second-surface side of the substrate; and a second electrical connector extending through the substrate and electrically connecting the second power-supply pattern and each of the two second heating patterns to each other, the second electrical connector being located on an outer side of an outermost portion of each of the two second heating patterns in the longitudinal direction of the substrate, wherein the second power-supply pattern is located on an inner side of an outermost portion of the first heating pattern in a widthwise direction of the substrate that is orthogonal to the longitudinal direction and parallel to the first surface of the substrate, wherein the second electrical connector connected to one of the two second heating patterns is located between a first end of the substrate in the longitudinal direction and a first outermost portion of the one of the two second heating patterns in the longitudinal direction, and the second electrical connector connected to the other of the two second heating patterns is located between a second end of the substrate in the longitudinal direction and a second outermost portion of the other of the two second heating patterns in the longitudinal direction, the first outermost portion of the one of the two second heating patterns in the longitudinal direction being the closest outermost portion, of the two second heating patterns, to the first end of the substrate in the longitudinal direction, the second outermost portion of the other of the two second heating patterns being the closest outermost portion, of the two second heating patterns, to the second end of the substrate in the longitudinal direction, wherein the first heating pattern includes:

a first heating line extending in the widthwise direction of the substrate;

a second heating line extending in the widthwise direction of the substrate and spaced away from the first heating line in the longitudinal direction of the substrate;

a third heating line extending in the longitudinal direction of the substrate; and a fourth heating line extending in the longitudinal direction of the substrate and spaced away from the third heating line in the widthwise direction of the substrate, and wherein the first electrical connector is located between the first heating line and the second heating line, the first electrical connector being located between the third heating line and the fourth heating line.

12. The heater according to claim 11, further comprising a third power-supply pattern located on the first-surface side of the substrate and electrically connecting each of the two second heating patterns and the second electrical connector to each other, the third power-supply pattern extending from each of the two second heating patterns toward a longitudinal outer side of the substrate.

13. The heater according to claim 11, wherein a region in which each of the two second heating patterns is formed in the longitudinal direction does not overlap a region in which the first heating pattern is formed in the longitudinal direction.

14. The heater according to claim 11, wherein the substrate comprises a hole in which the first electrical connector formed of a conductive material is located, and wherein the heater further comprises a first insulating layer formed between the first surface and the first heating pattern, a second insulating layer formed between the second surface and the first power-supply pattern, and a third insulating layer formed between the first electrical connector and an inner circumferential surface of the hole.

15. The heater according to claim 11, wherein the first terminal is disposed on the second-surface side of the substrate.

* * * * *